(12) United States Patent
Fu, Jr. et al.

(10) Patent No.: US 9,707,790 B2
(45) Date of Patent: Jul. 18, 2017

(54) PRINTABLE MEDIA

(71) Applicant: Hewlett-Packard Development Company, L.P., Fort Collins, CO (US)

(72) Inventors: Xulong Fu, Jr., San Diego, CA (US); Xiaoqi Zhou, San Diego, CA (US); Paul C. Landrum, San Diego, CA (US); Francois K. Pirayesh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/119,485

(22) PCT Filed: Mar. 17, 2014

(86) PCT No.: PCT/US2014/030607
§ 371 (c)(1),
(2) Date: Aug. 17, 2016

(87) PCT Pub. No.: WO2015/142313
PCT Pub. Date: Sep. 24, 2015

(65) Prior Publication Data
US 2017/0057269 A1    Mar. 2, 2017

(51) Int. Cl.
*B41J 2/01* (2006.01)
*B41J 2/335* (2006.01)
*B32B 5/02* (2006.01)
*B32B 5/26* (2006.01)
*B41M 5/50* (2006.01)
(Continued)

(52) U.S. Cl.
CPC .............. *B41M 5/508* (2013.01); *B32B 5/022* (2013.01); *B32B 5/26* (2013.01); *B32B 7/12* (2013.01);
(Continued)

(58) Field of Classification Search
CPC ......... B41J 2/01; B41J 2/33535; B32B 5/022; B32B 5/26; B41M 5/508
See application file for complete search history.

(56) References Cited

U.S. PATENT DOCUMENTS 4,339,491 A    7/1982   Lauterbach et al.
5,401,793 A    3/1995   Kobayashi et al.
(Continued)

FOREIGN PATENT DOCUMENTS

GB    2407832       5/2005
JP    2001270230    10/2001
(Continued)

OTHER PUBLICATIONS

International Search Report dated Dec. 16, 2014 for PCT/US2014/030607, Applicant Hewlett-Packard Development Company, L.P.

*Primary Examiner* — Jason Uhlenhake
(74) *Attorney, Agent, or Firm* — HP Inc. Patent Department (57) ABSTRACT

A printable recording media including a composite base substrate that contains, at least, two constituent material layers that are laminated together with a flame resistant adhesion layer containing an adhesive compound and up to 50% of a flame retardant agent by total weight of the flame resistant adhesion layer, wherein, at least, one of the constituent material layer is a fiber layer; and an image receiving layer that is coated on one side of the composite supporting substrate. Also disclosed are the method for making such printable recording media and the method for producing printed images on such printable recording media.

15 Claims, 2 Drawing Sheets

(51) Int. Cl.
  *B32B 7/12* (2006.01)
  *B41M 5/52* (2006.01)
  *B41M 3/18* (2006.01)
  *D21H 27/20* (2006.01)
  *B32B 27/10* (2006.01)
  *D21H 21/34* (2006.01)

(52) U.S. Cl.
  CPC .............. *B32B 27/10* (2013.01); *B41J 2/01* (2013.01); *B41M 3/18* (2013.01); *B41M 5/504* (2013.01); *B41M 5/506* (2013.01); *B41M 5/52* (2013.01); *B41M 5/5218* (2013.01); *B41M 5/5254* (2013.01); *D21H 21/34* (2013.01); *D21H 27/20* (2013.01); *B32B 2250/02* (2013.01); *B32B 2250/20* (2013.01); *B32B 2255/02* (2013.01); *B32B 2255/26* (2013.01); *B32B 2262/0253* (2013.01); *B32B 2262/062* (2013.01); *B32B 2307/75* (2013.01); *B41M 2205/34* (2013.01); *B41M 2205/36* (2013.01)

(56) References Cited

U.S. PATENT DOCUMENTS

| | | | |
|---|---|---|---|
| 6,589,633 | B1 | 7/2003 | Ino et al. |
| 7,871,947 | B2 | 1/2011 | Flack |
| 8,563,100 | B1 | 10/2013 | Zhou et al. |
| 2007/0275617 | A1 | 11/2007 | Harris et al. |
| 2013/0209801 | A1 | 8/2013 | Coudyser et al. |
| 2013/0216738 | A1 | 8/2013 | Owusu et al. |
| 2013/0240021 | A1* | 9/2013 | Mu .............. B32B 3/266 136/251 |
| 2013/0280535 | A1* | 10/2013 | Maas ............ A62C 2/065 428/412 |

FOREIGN PATENT DOCUMENTS

| | | |
|---|---|---|
| JP | 2009107254 | 5/2009 |
| KR | 20040084746 | 10/2004 |
| WO | 2008076101 | 6/2008 |

* cited by examiner

PRINTABLE MEDIA

BACKGROUND

Inkjet printing technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of media substrates. Inkjet printing technology has found various applications on different substrates including, for examples, cellulose paper, metal, plastic, fabric, and the like. The substrate plays a key role in the overall image quality and permanence of the printed images.

Large format print media becomes more and more popular and finds use in many applications such as wall coverings, banners, and signs of many types that can be printed to create images with one or more symbols, text and photographs. When printing on such substrates, challenges exist due to their specific nature. Durability and flame retardancy of the print media and of the image printed thereon are in consideration for wall coverings for examples. Accordingly, investigations continue into developing media substrates that can be effectively used for large format printing and/or for wall coverings and which impart good printing performances as well as fire resistance.

BRIEF DESCRIPTION OF THE DRAWINGS

The drawings illustrate various embodiments of the present printable media and are part of the specification.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure refers to a printable recording media comprising a composite base substrate that contains, at least, two constituent material layers that are laminated together with a flame resistant adhesion layer, containing an adhesive compound and up to 50% of a flame retardant agent by total weight of the flame resistant adhesion layer; wherein, at least, one of the constituent material layer is a fiber layer; and an image receiving layer that is coated on one side of the composite supporting substrate. Also disclosed are a method for making such media and a method for producing printed images on such printable recording media.

The printable media, as disclosed herein, can be used as a wall covering material (e.g., wallpaper) for home or commercial use, for decoration or display as well as signs or banners and the like. In some examples, the printable media of the present disclosure is a wall covering substrate. In some other examples, the printable media is a wall covering substrate that contains a multi-layer composite structure. The composite structure includes laminated layers that form a non-image side and an image side on the printable media. The non-image side, or backside, is the side that would face and attach to a wall, in a wall covering application, or even in a sign or banner application having a single image side. The image side is the side that includes material layers to receive, support and protect an image.

The term "wall covering," as used herein, means a large format print media that has a length that is much larger than a width (or vice versa) relative to small format office paper or photo media products (e.g., letter, A4, legal, etc. sizes). For example, the wall covering may be provided in a roll that is 1.37 meters (54 inches) wide and 27.43 meters (30 linear yards) long. Moreover, the term "wall covering" means a print media that supports various imaging materials and applications, for example, various types of inkjet inks and inkjet printing, for image formation, including digital printing. In addition, the term "wall covering" means a product that complies with federal and industry standards or specifications for wall coverings including, but may not be limited to, CCC-W-408A and D, ASTM F793 and CFFAW-101D. Under these standards, wall coverings have weight and durability requirements depending on which category or type that the wall covering falls within. Category I is for decorative only wall covering, while Category VI is for commercial serviceability wall covering. (Types I, II and III wall coverings are substantially equivalent to Categories, IV, V and VI, respectively, among the standards). The wall covering according to the principles described herein has wear and tear durability of Type-II, or possibly higher grade, wall coverings in accordance with the aforementioned standards and may meet or exceed established criteria for Type-II wall coverings under the aforementioned standards. Herein, the term "wall covering," "wall covering print media," and "wall covering digital print media" may be used interchangeably.

In some examples, the printable media of the present disclosure, when used a wall covering, have a durability that may meet or exceed Type-II, commercial serviceability wall covering standards or specifications, to provide a durable Type-II wall covering that is also free of polyvinyl chloride (PVC), which is harmful to the environment. In some other examples, the printable media, when used a wall covering in an in-door environmental, is able to meet "Fire Resistance or flame resistance" standards such as ASTM E84 for example. In yet some other examples, the printable media, when used in a wall covering application, has a mechanical breaking strength that is within a range of at least 50 lb to about 60 lb; or within a range of about 55 lb to about 60 lb. The mechanical breaking strength in the Machine Direction (MD) can be between about 58 lb and about 60 lb and in the Cross Machine Direction (CMD) can be between about 55 lb to about 58 lb. Such measurements are made according to the ASTM D751 "Standard test method for coated fabrics". The printable media, when used in a wall covering application, can have a minimum scrubbability resistance of 300 cycles, or maybe more, of linear abrasion. Such measurements are made according to the ASTM F793 "Standard test method for coated fabrics".

The printable media can be an inkjet printable media. The printable media can thus be specifically designed to receive any inkjet printable ink, such as, for example, organic solvent-based inkjet inks or aqueous-based inkjet inks Examples of inkjet inks that may be deposited, established, or otherwise printed on the printable media, include pigment-based inkjet inks, dye-based inkjet inks, pigmented latex-based inkjet inks, and UV curable inkjet inks.

Figure 1:
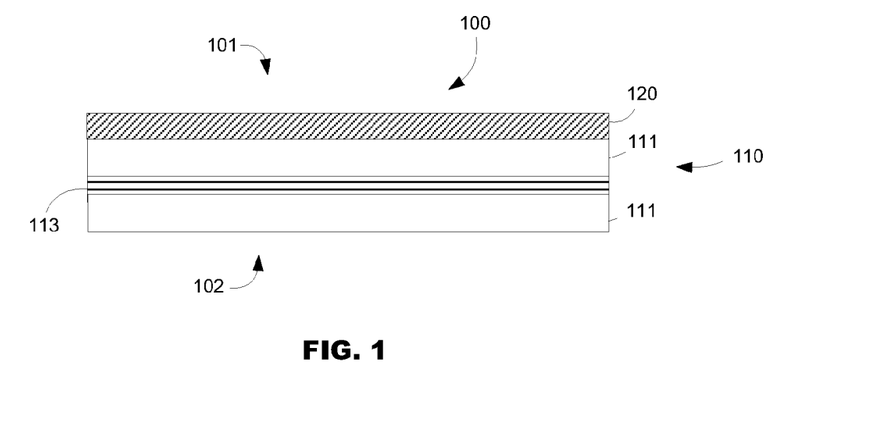
FIGS. 1, 2 and 3 are cross-sectional views of the printable media according to embodiments of the present disclosure.

FIG. 1 schematically illustrates an example of a printable media (100) of the present disclosure. It is to be understood that the thickness of the various layers is exaggerated for illustrative purposes. The printable recording media (100) has an image or printed side (101) and a backside or opposing side (102). The image side (101) of the media is the side that includes material layers that will receive, support and protect an image. The backside, or opposing side, (102) is not designed for receiving printed image and is the side that would face and attach to a subject such as a panel, a board and a wall surface in a wall covering application, or even in a sign or banner application having a single image side.

Figure 2:
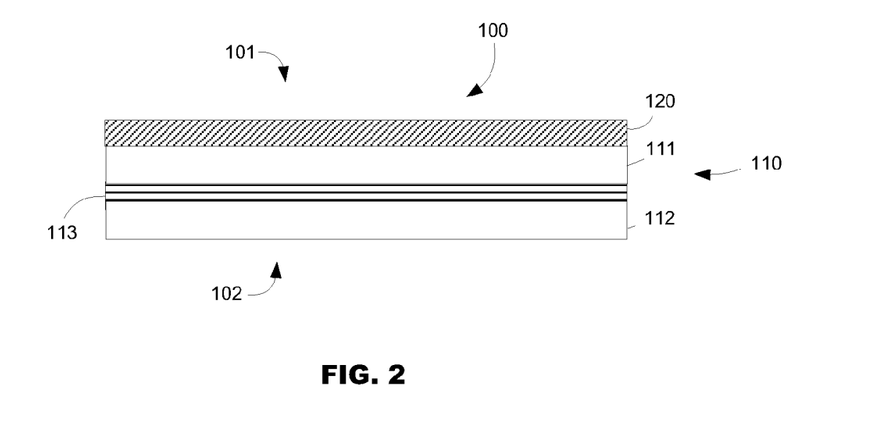

As illustrated in FIG. 1, the printable recording media (100) encompasses a composite supporting base substrate (110), above which is applied an image receiving layer (120). The image receiving layer (120) is applied on one side of the supporting base substrate (110). The printable recording media (100) includes a supporting composite base substrate (110) that contains two constituent fiber layers (111) that are laminated together with a flame resistant adhesion layer (113). The flame resistant adhesion layer (113) is located between the two constituent material layers (111). As illustrated in FIG. 1, each constituent material layers are fiber layers (111). As illustrated in FIG. 2, one constituent material layer is a fiber layer (111), the other constituent material layer is a fabric layer (112).

Figure 3:
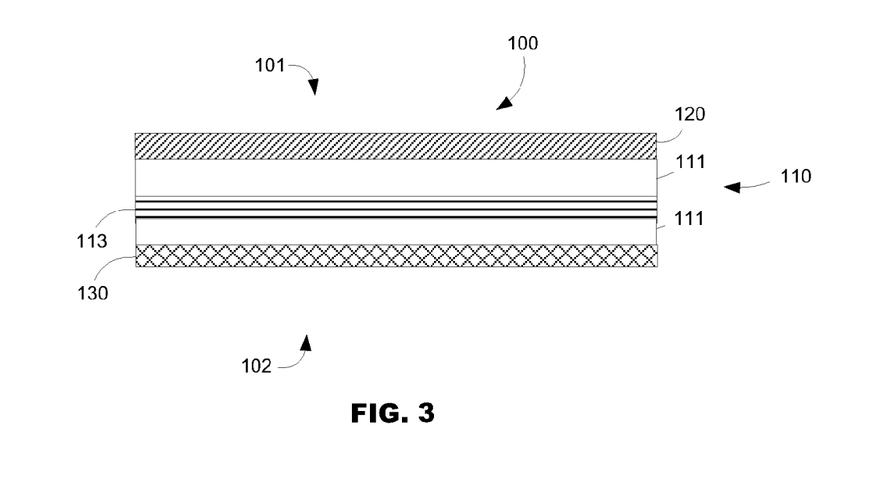

FIG. 3 illustrates a side view of another example of the printable recording media (100) structure in accordance with the examples described herein. The composite supporting base substrate (110) of the printable recording media (100) contains two constituent fiber layers (111) that are laminated on each side of a flame resistant adhesion layer (113). The printable recording media (100) includes an image receiving layer (120) coated on the image side (101) of the composite supporting base substrate (110) and includes also a barrier layer (130) on the backside (102) of the composite supporting base substrate (110).

Figure 4:
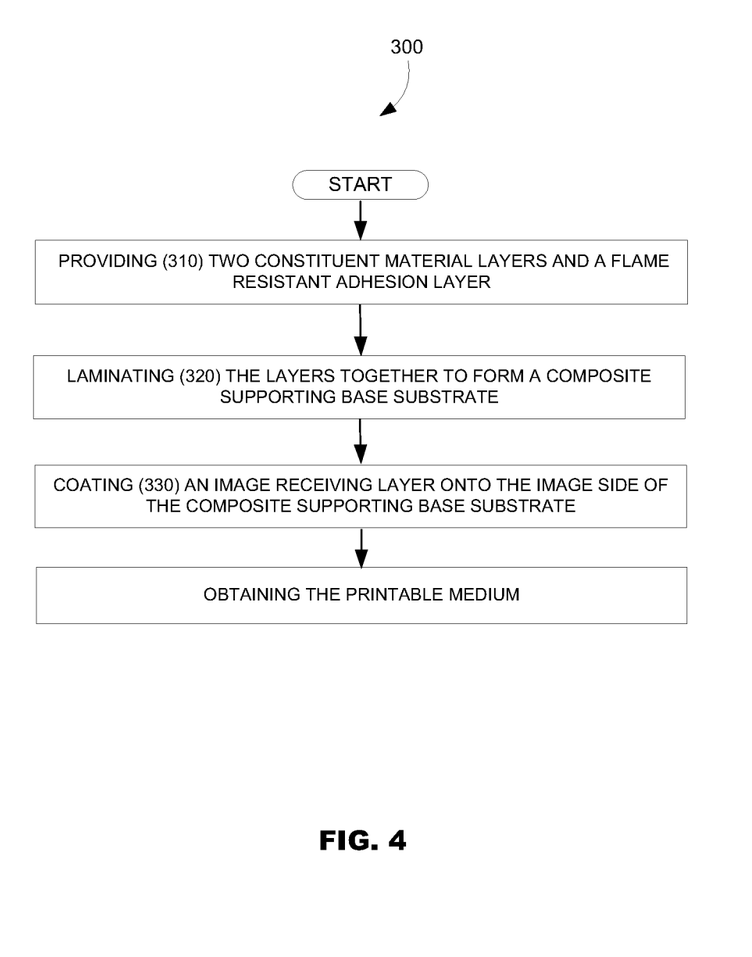
FIG. 4 is a flowchart illustrating the method for making the printable media according to some embodiments of the present disclosure.

FIG. 4 is a flowchart illustrating methods of making the printable recording media such as described herein. Such method (300) encompasses: providing (310) two constituent material layers and a flame resistant adhesion layer (113); laminating (320) the two constituent material layers and the flame resistant adhesion layer (113) to form a composite supporting base substrate (110); and then coating (330) an image receiving layer (120) onto the image side of the composite supporting base substrate (110).

The printable media has a supporting base substrate having, two constituent material layers (111) and (112) that are laminated together with a flame resistant adhesion layer (113) containing an adhesive compound and up to 50% of a flame retardant agent by total weight of the flame resistant adhesion layer, wherein, at least, one of the constituent material layer is a fiber layer; and an image receiving layer (120) that is coated on one side of the composite supporting substrate.

The Composite Base Substrate

The composite supporting substrate (110) (or composite base substrate or composite structure) has, at least, two constituent material layers that form an image side (101) and a back side (102) (or non-image side); one of these constituent material layers is a fiber layer. A flame resist adhesion layer, containing an adhesive compound and up to 50% of a flame retardant agent by total weight of the flame resistant adhesion layer, is located between these two constituent material layers. The two constituent material layers and the flame resistant adhesion layer are laminated together in order to form a laminated composite supporting substrate. In some examples, the two constituent material layers of the composite base substrate are fiber layers. In some other examples, one constituent material layer of the composite base substrate is a fiber layer and the other constituent material layer is a fabric layer.

The word "supporting" refers herein to a substrate where the printing image can be formed on one side of the substrate, i.e. the image side (101), via an image receiving coating deposited on the surface of the support. The word "supporting" also refers to a physical objective of the substrate which is to carry the image with any desired geometry and size with excellent durability or mechanical strength. The word "composite" refers herein to a material made from at least two constituent material layers, or layers, that have different physical and/or chemical properties from one another, and wherein these constituent materials/layers remain separate at a molecular level and distinct within the structure of the composite. The "composite structure", as used herein, is the support or substrate of the printable media supports wall covering material layers including, but not limited to, one or more of imaging receiving, imaging, protective material layers, as well as adhesive compounds coated as separate layers onto the composite structure. Moreover, the composite supporting base substrate (110) supports a wall covering when applied or attached to a surface or wall in a variety of applications and environments, for example, high moisture and high abrasion environments. The composite supporting substrate is a laminated structure. The "laminated", as used herein, reflect the fact that the layers or compounds have been applied to each other using a lamination process. In some examples, the composite further includes an adhesive constituent layer laminated between two other constituent layers.

The composite supporting base substrate (110) can be considered a smooth material that may be flat to receive the ink receiving coating layer (120). By "smooth", it is meant that the surface roughness of the fiber layer is no greater than about 5 microns by PPS method (i.e., Parker Print Surf method). In some examples, the surface roughness by PPS method of the fiber layer is no greater than 4 microns, or no greater than 2 microns, or no greater than about 0.5 microns.

In some examples, the composite supporting base substrate (110) is durable and flexible support. By "durable", it is meant that the composite supporting substrate has a high tolerance to certain physical forces and surface degradation forces. The durability of the composite supporting substrate is manifested according to one or more of tear and tensile strength, surface abrasion, water and solvent resistance, fire resistance, dimensional stability, stain resistance, heat ageing, cold climate, and others described in the wall covering classification standards ASTM F793 and Federal Specification CCC-W-408D, for example, for Type II commercial serviceability wall coverings. The composite supporting base substrate (110) may be porous or non-porous, and may be substantially flexible. By "flexible", it is meant pliant or pliable and able to be rolled and unrolled without breaking or cracking, for example.

The composite base substrate (110), which contains two constituent material layers, is laminated together with a flame resistant adhesion layer (113), wherein, at least, one of the constituent material layers is a fiber layer (111).

The fiber layer (111) can contain fibers which are sourced from natural wood species only and include fibers from recycling pulps (i.e. wood fiber base) (no polymer fiber). The fiber layers can contain a synthetic polymeric material as a first material and a natural fiber as a second material. The amount of synthetic polymeric material can be within a range of about 2 wt % to about 80 wt %; or can be within a range of about 5 wt % to about 40 wt % by weight of total fibers. The fiber layer (111) can also contain a non-woven fiber structure that comprises synthetic fiber within a range of about 5% to about 40% by weight of total fiber.

The fiber layer of the composite supporting base substrate (110) may comprise a PVC-free synthetic polymeric component that is one of synthetic polymeric material in a non-woven structure and a synthetic polymeric film. In some examples, the synthetic polymeric material can be selected from the group consisting of polyolefins, polyamides, polyesters, polyurethanes, polycarbonates, polyacrylics, a combination of two or more of the fibers, and a mixture of two or more of the fibers. The synthetic polyolefin fiber may include, but is not limited to, polyethylene fiber, polyethylene copolymer fiber, polypropylene fiber, polypropylene copolymer fiber, a combination of two or more of the polyolefin fibers, a combination of any of the polyolefin fibers with another polymeric fiber, mixtures of two or more of the polyolefin fibers, or mixtures of any of the polyolefin fibers with another polymer fiber. In some examples, the fiber layer may include a synthetic cellulosic material including, but not limited to, cellulose diacetate, cellulose triacetate, cellulose propionate, cellulose butyrate, cellulose acetate butyrate and nitrocellulose.

The fiber composition can be used to form a web having a non-woven structure, for example, using paper making equipment. The fibers may have an average length within a range of about 1 millimeter (mm) to about 4 mm. This length is comparable to the length of natural cellulose fibers. In some examples, the synthetic polymeric material has a length greater than 3 mm, provided that the synthetic polymeric material does not negatively impact the formation of the fiber layer using the paper making equipment, for example on a screen of a paper mill. In some other examples, the synthetic polymeric material has diameter within a range of about 10 micrometers or microns (μm) to about 40 μm with an average length within a range of about 2 mm and about 3 mm. The amount of the synthetic polymeric material in the fiber layer depends on the length of the fiber. For example, the use of longer synthetic fibers may allow for improvement in dimensional stability of the composite supporting substrate with lower amounts of the synthetic fibers being used.

When present, the synthetic polymeric component of the fiber layer of the composite supporting base substrate (110) can be a PVC-free synthetic polymeric film of high molecular weight. By 'high molecular weight', it is meant a weight average molecular weight ($M_w$) that is greater than $1\times10^4$ grams per mole (g/mol). The synthetic polymeric film may be made from a non-vinyl chloride polymer including, but not limited to, one or both of homopolymers and copolymers of polyethylene (PE), polypropylene (PP), nylon (polyamides), polystyrene, acrylonitrile butadiene styrene (ABS), polycarbonate, a combination of two or more thereof, or a mixture of two or more thereof. By 'non-vinyl chloride polymer' it is meant that there is no polyvinyl chloride (PVC) existing in the synthetic polymeric film, or that the synthetic polymeric film contains no vinyl chloride chain units (i.e., a PVC-free film), since polyvinyl chloride is known to be harmful to the environment, as mentioned above.

The synthetic polymeric component can be a polypropylene film having a weight average molecular weight ($M_w$) within a range of about $2.90\times10^5$ g/mol to about $3.95\times10^5$ g/mol, as measured by gel permeation chromatography (GPC) calibrated with a polystyrene standard. The molecular weight distribution as presented by $M_w/M_n$, where $M_n$ is the number average molecular weight, ranges from about 2.9 to about 4.8 for this example. Moreover in this example, the polypropylene film may be either uni-oriented or biaxially oriented with a density of about 0.85 g/cm$^3$ for amorphous area and of about 0.94 g/cm$^3$ for crystalline area. Also, the polypropylene film may have a melt point that may be within a range of about 140° C. to about 185° C.

As indicated above, the fiber composition of the fiber layer (111) of the composite supporting substrate (110) may comprise both synthetic fibers and natural fibers. The natural fiber includes natural cellulose fiber from either hardwood species or hardwood species and softwood species. In some examples, a ratio of hardwood fiber to softwood fiber in the fiber layer can be within a range of about 100:0 to about 50:50. The natural cellulose fiber may be processed into various pulps including, but not limited to, wood-free pulp, such as bleached or unbleached Kraft chemical pulp and bleached or unbleached sulfite chemical pulp; wood-containing pulp, such as one or more of ground wood pulp, thermo-mechanical pulp, and chemo-thermo-mechanical pulp; pulp of non-wood natural fiber, such as one or more of bamboo fiber, bagasse fiber, recycled fiber, cotton fiber; a combination of two or more pulps, or a mixture of two or more of pulps. An amount of synthetic polymeric material in the fiber layer composition that further includes natural fiber may be within a range of about 5 wt % to about 80 wt % by weight of total fiber. In some examples, the amount of synthetic polymeric material by weight of total fiber in the fiber layer composition is about 10 wt % to about 50 wt %, or about 10 wt % to about 40 wt %.

The fiber layer (111) of the composite supporting base substrate (110) forms a film that can have a thickness within a range of about 40 microns to about 300 microns. In some examples, the thickness of the synthetic polymeric film of the fiber layer is within the range of about 60 microns to about 200 microns, or about 80 microns to about 150 microns. The fiber layer of the composite supporting base substrate (110) forms a film that can have a density in a range of about 0.50 grams per cubic centimeter (g/cm$^3$) to about 1.2 g/cm$^3$. In some other examples, the density of the fiber layer is within the range of about 0.60 g/cm$^3$ to about 1.0 g/cm$^3$, or about 0.75 g/cm$^3$ to about 0.90 g/cm$^3$.

In some examples, the fiber layer is a synthetic polymeric film having a thickness within a range of about 40 microns to about 300 microns and a density within a range of about 0.50 gram per cubic centimeter (g/cm$^3$) to about 1.2 g/cm$^3$, the synthetic polymeric film being one or both of homopolymers and copolymers of high molecular weight selected from the group consisting of polyethylene, polypropylene, polyamide, polystyrene, acrylonitrile butadiene styrene, polycarbonate, a combination of two or more thereof, and a mixture of two or more thereof. In some other examples, the fiber layer is laminated to the fabric layer and has a surface roughness of less than about 5 microns by PPS method on an image side, the fiber layer comprising one of a non-woven fiber structure that comprises synthetic polymeric material within a range of about 10% to about 40% by weight of total fiber and a synthetic polymeric film having a thickness within a range of about 40 microns to about 300 microns;

The fiber layer (111) of the composite supporting base substrate (110) may further comprise a polymeric binder. The polymeric binder may be pre-mixed with one or both of the synthetic polymeric materials and the natural fiber, for example. Examples of polymeric binder included in the fiber layer composition include, but are not limited to, water soluble polymers, such as polyvinyl alcohol, starch derivatives, gelatin, cellulose derivatives, acrylamide polymers; water-dispersible polymers, such as acrylic polymers or copolymers, vinyl acetate latex, polyesters, and styrene-butadiene or acrylonitrile-butadiene copolymer latex; a combination of two or more of the above polymeric binders; or a mixture of two or more of the above polymeric binders. The polymeric binder may have a glass transition temperature (Tg) within a range of about −30° C. to about 10° C. In some examples, the Tg of the polymeric binder is within a range of −25° C. to about 10° C., or −20° C. to about 10° C., or −15° C. to about 10° C., or −10° C. to about 10° C. A ratio of latex resin binder to the natural cellulose fiber in the fiber layer composition may range from about 1:20 to about 1:1. In some examples, the ratio of latex resin binder to the natural cellulose fiber in the fiber layer composition ranges from about 1:15 to about 1:1, or about 1:10 to about 1:1, or about 1:5 to about 1:1. Moreover, aqueous coupling agents also may be used in the fiber layer composition in an amount to improve binding between the fibers. Representative examples of commercially available coupling agents include, but are not limited to, Dow Corning® Z 6032, Dow Corning® Z 6030, and Dow Corning® Z 6040 silanes from Dow Corning, Inc., MI, USA, or Struktol® SCA 98, Struktol® SCA 930, and Struktol® SCA 960 organosilanes from Struktol Company of America, OH, USA.

In some examples, the composite base substrate (110) contains two constituent material layers which are laminated together with a flame resistant adhesion layer (113), wherein one of the constituent material layers is a fiber layer (111) and the other constituent material layer (112) is a fabric layer.

The term "fabric", as used herein, is intended to mean a textile, a cloth, a fabric material, fabric clothing, or another fabric product that has mechanical strength and air permeability. The term "fabric structure" is intended to mean a structure having warp and weft that is woven, non-woven, knitted, tufted, crocheted, knotted or pressed, for example. The terms "warp" and "weft" refers to weaving terms that have their ordinary means in the textile arts. As used herein, warp refers to lengthwise or longitudinal yarns on a loom, while weft refers to crosswise or transverse yarns on a loom. The fabric layer of the composite supporting substrate includes a fabric having warp and weft to facilitate airflow on the non-image side. Airflow refers to one or both of through a thickness of the fabric (e.g., z direction) and along an interface between the fabric and a surface, such as a wall, to which the non-image side of the fabric is to be attached (e.g., x and y directions). Without behind linked by any theory, it is believed that adequate airflow helps to prevent formation of some detrimental biological growth, such as mold and mildew formation. Adequate airflow may be validated by two separate methods. A first method uses fluid-flow measurements per ASTM E96, which determines the relative water-vapor transmission rate through a media. A second method is per ASTM D6329 in combination with UL GreenGuard Test Method P040, which determines an ability of the media to grow and sustain mold and mildew formations.

The fabric layer has a fabric structure that includes, but is not limited to, one of woven, non-woven, knitted and tufted; and has a fabric surface that may be one of flat or exhibits pile. Moreover, the fabric structure may have a surface roughness or texture to form airflow channels or pathways at the interface with the wall surface to which the fabric is to be attached to facilitate airflow. The fabric may have one or both mechanical strength properties and air permeability properties. The fabric layer of the composite supporting substrate (110) can be a woven, non-woven, knitted or tufted fabric structure. In some examples, the fabric of the fabric layer is a woven textile including, but not limited to, satin, poplin, and crepe weave. In some other examples, the fabric layer is a knitted textile including, but not limited to, circular knit, warp knit, and warp knit with a micro denier face.

The fabric layer can also be a knitted fabric with a loop structure including one or both of warp-knit fabric and weft-knit fabric. The weft-knit fabric refers to loops of one row of fabric are formed from the same yarn. The warp-knit fabric refers to every loop in the fabric structure is formed from a separate yarn mainly introduced in a longitudinal fabric direction. In some examples, the fabric of the fabric layer is a non-woven product, for example a flexible fabric that includes a plurality of fibers or filaments that are one or both of bonded together and interlocked together by a chemical treatment process (e.g., a solvent treatment), a mechanical treatment process (e.g., embossing), a thermal treatment process, or a combination of two or more of these processes.

The fabric layer can comprise one or both of natural fibers and synthetic fibers. Natural fibers that may be used in the fabric layer include, but are not limited to, wool, cotton, silk, linen, jute, flax, or hemp. Additional fibers that may be used include, but are not limited to, rayon fibers, or those of thermoplastic aliphatic fibers derived from renewable resources, including, but not limited to, corn starch, tapioca products, or sugarcanes. These additional fibers are also referred to herein as "natural" fibers for simplicity of discussion. In some examples, the fiber layer includes a combination of two or more from the above-listed natural fibers, a combination of any of the above-listed natural fibers with another natural fiber or with synthetic fiber, a mixture of two or more from the above-listed natural fibers, or a mixture of any thereof with another natural fiber or with synthetic fiber.

The synthetic fiber that may be used in the fabric layer is polymeric fiber including, but not limited to, polyvinyl chloride (PVC)-free fibers made of polyester, polyamide, polyimide, polyacrylic, polypropylene, polyethylene, polyurethane, polystyrene, polyaramid, e.g., Kevlar®, polytetrafluoroethylene, e.g., Teflon® (both trademarks of E. I. du Pont de Nemours and Company), fiberglass, polytrimethylene, polycarbonate, polyester terephthalate, or polybutylene terephthalate. In some examples, the fiber used in the fabric layer includes a combination of two or more of the fibers, a combination of any of the fibers with another polymeric fiber or with natural fiber, a mixture of two or more of the fibers, or a mixture of any of the fibers with another polymer fiber or with natural fiber. In some examples, the synthetic fiber includes modified fibers. The term 'modified fibers' refers to one or both of the polymeric fiber and the fabric as a whole having undergone a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units present in the wall covering or the composite supporting substrate.

The fabric layer of the composite supporting substrate (110) can contain both natural fibers and synthetic fibers. In some examples, the amount of synthetic fibers represents from about 20% to about 90% of the total amount of fibers. In some other examples, the amount of natural fibers represents from about 10% to about 80% of the total amount of fibers. In some other examples, the fabric layer of the composite supporting substrate (110) comprises natural fibers and synthetic fibers in a woven structure, the amount of natural fibers is about 10% of a total fiber amount and the amount of synthetic fibers is about 90% of the total fiber amount.

The fabric layer (112) of the composite supporting substrate (110) may contain additives including, but not limited to, one or more of colorant (e.g., pigments, dyes, tints), antistatic agents, brightening agents, nucleating agents, antioxidants, UV stabilizers, fillers, flame retardants, and lubricants, for example. The additives are included to improve various properties of the fabric.

The composite base substrate (110) that contains two constituent material layers comprised also a flame resistant adhesion layer (113). The flame resistant adhesion layer (113) contains an adhesive compound and up to 50% of a flame retardant agent by total weight of the flame resistant adhesion layer and is sandwiched between the two constituent material layers.

In some examples, the flame resistant adhesion layer (113) forms a layer, between the two constituent material layers of the composite base substrate (110), having a coat weight ranging from about 5 gsm to about 70 gsm, or ranging from about 30 gsm to about 60 gsm. In some other examples, in the flame resistant adhesion layer, the ratio of the amount of the adhesive compound to the amount of flame retardant agent is within the range of about 50:50 to about 80:20 or within the range of about 60:40 to about 70:30.

The function of the adhesive compound is to form a thin and continuous layer together with a flame retardant agent, in order to increase the hydrophobicity and the flame resistance of composite base substrate. The adhesive compound or compound can be any adhesive compound which is able to bonder two materials together with adequate strength. The adhesive may be an aqueous latex adhesive that is selected from a wide variety of resin latex. In some examples, the adhesive compound is polymeric latex. Such polymeric latex can be polyurethane based latex which is able form a continuous film in which the flame retardant agent (for example particles of phosphorus-containing compounds and nitrogen-containing compounds) are embedded inside.

The resin latex of the adhesive may include, but is not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl acrylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylic acid containing monomers (e.g., acrylic acid, methacrylic acid), vinyl ester monomers (e.g., vinyl acetate, vinyl propionate, vinyl benzoate, vinyl pivalate, vinyl-2-ethylhexanoate, vinyl versatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethylene glycol dimethacrylate, bis(acryloylamido)methylene), and combinations thereof. Polymers made from one or both of the polymerization and copolymerization of alkyl acrylate, alkyl methacrylate, vinyl esters, and styrene derivatives also may be used. Representative examples of commercially available adhesive products include, but are not limited to, Acronal® 788 or Acronal® 866 from BASF North America; RayCryl® 347 from Specialty Polymers, Inc., OR, USA; and Flexbond® 325 or Flexbond® 825 from Air Products, Inc., PA, USA.

In some examples, the adhesive compound is an epoxy-functional additive. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez® AR555 (commercially available from Air Products), Ancarez® AR550, Epi-rez® 3510W60, Epi-rez® 3515W6, or Epi-rez® 3522W60 (commercially available from Hexion). In some other examples the adhesive compound is an epoxy resin. Examples of suitable aqueous dispersions of epoxy resin include Waterpoxy® 1422 (commercially available from Cognis) or Ancarez® AR555 1422 (commercially available from Air Products).

In some examples, the flame resistant adhesion layer (113) comprises a curing agent. The curing agent can be an epoxy resin hardeners. Such epoxy resin hardeners can be, for example, water-based polyfunctional amines, acids, acid anhydrides, phenols, alcohols and/or thiols. Examples of epoxy resin hardeners include also liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available curing agent include Anquawhite® 100

(from Air Products) and EPI-CURE® 8290-Y-60 (from Hexion). In some other examples, the flame resistant adhesion layer (113) can include water-based polyamine as curing agent. In yet some other examples, the flame resistant adhesion layer (113) comprises water-based epoxy resin as an adhesive compound and water-based polyamine a curing agent. The curing agent can be present in the flame resistant adhesion layer in an amount representing from about 1 to 10 parts per weight.

The flame resistant adhesion layer comprise up to 50% of a flame retardant agent by total weight of the flame resistant adhesion layer. In some examples, the flame retardant agent is present, in the flame resistant adhesion layer (113), in an amount representing from about 5 to 50 parts per weight or from about 15 to 40 parts per weight. As flame retardant agent, it is meant herein any substance that inhibits or reduces flammability or delays their combustion of the media containing it. In some examples, the flame retardant agent is selected from the group consisting of phosphorus-containing compounds, nitrogen-containing compounds and organophosphate compounds, alumina trihydrate and calcium carbonate. Phosphorus-containing compounds encompass organic and inorganic phosphates, phosphonates, and/or phosphinates with different oxidation states. Nitrogen-containing compounds that can likewise be used include melamines (including melamine derivatives) such as melamine, melamine cyanurate, melamine polyphosphate, melem, and melon. Examples of organophosphate compounds include aliphatic phosphates and phosphonates and aromatic phosphonates. The organophosphate compound can be an organophosphonate with four oxygen atoms attached to the central phosphorus; an aliphatic, aromatic, or polymeric organophosphate with 3 oxygen atoms attached to the central phosphorus, or an organophosphinate with 2 oxygen atoms attached to the central phosphorus atom. Specific examples of organophosphates include diphenyl-phosphate (TPP), resorcinol bis(diphenylphosphate) (RDP), bisphenol A diphenyl-phosphate (BADP), tricresyl-phosphate (TCP); dimethyl-phosphonate, 2,2-Oxybis[5,5-dimethyl-1,3,2-dioxaphosphorinane]2,2-disulphide, bisphenol-A-bis(diphenyl-phosphate)diethyl-phosphonate, diethylphosphinate aluminum salt, dimethyl-propyl-phosphonate, diethyl N,N-bis(2-hydroxyethyl), aryl-phosphates, cresyl diphenyl-phosphate (diphenyl-tolyl-phosphate); cyclic phosphonate; diethyl-ethyl phosphonate, dimethyl-methyl-phosphonate; diphenyl (2-ethylhexyl) phosphate or the like. Compounds having a molecular structure that includes both nitrogen and phosphorus also show acceptable properties. Examples of such compounds include APP (ammonium polyphosphate), PDSPB (poly (4, 4-diaminodiphenyl methane spirocyclic pentaerythritol bisphosphonate)), DTPAB (1, 4-di (diethoxy thiophosphamide benzene), aminomethyl phosphonate, ethylenediamine-o-phosphate, modified guanidine phosphate, melamine phosphate, melamine polyphosphate, melamine-poly(aluminum phosphate) and mixtures thereof. Compounds having a molecular structure that includes both metal element and phosphorus also show acceptable properties. Examples of such compounds include aluminum diethylphosphinate, calcium diethylphosphinate and mixtures thereof. The compounds that contain both phosphorus and a halogen show less adverse environmental impact. Such compounds include tris(2,3-dibromopropyl) phosphate and chlorinated organophosphates such as tris(1, 3-dichloro-2-propyl)phosphate (TDCPP), tetrekis(2-chlorethyl) dichloro-isopentyldiphosphate, tris (1,3-dichloroisopropyl) phosphate, tris (2-chloroisopropyl) phosphate, tris (2-chloroisopropyl) phosphate. The fire retardant agent can be also selected from mineral powders such as aluminum hydroxide (ATH), magnesium hydroxide, huntite and hydromagnesite hydrates, red phosphorus, boehmite (aluminum oxide hydroxide) and boron compounds, like borates.

Examples of commercially available products, include FR-102® (available from Shanghai Xusen Co Ltd) or Aflammit®-PE and Aflammit®-MSG (both available from Thor). Other examples of flame retardant agents include commercial available products such as Exolit® AP compounds (available from Clariant), Aflammit® compounds (available from Thor), Disflamoll® DPK (available from Lanxess), or Phoslite B compounds (available from Italmatch Chemicals).

In some examples, flame retardant agents, that can be used herein, have a water solubility limitation. In the ambient condition, the water solubility can be less than 0.5 g/100 g $H_2O$, or less than 0.15 g/100 g $H_2O$. Flame retardant agents with higher solubility are found to migrate easily on to the surface of the image receiving layer and decrease ink adhesion and image durability.

The Image Receiving Layer (120)

The printable media (100) further includes an image receiving layer (120) that is coated over a constituent material layer of the composite supporting base substrate, on the image side of the composite supporting base substrate (110).

The coat weight of the image receiving layer (120) may range, for example, from about 5 gsm to about 50 gsm or may ranges from about 10 gsm to about 20 gsm. Once coated, the image receiving composition dries to form a layer (i.e., the image receiving layer). In some examples, the thickness of the image receiving layer ranges from about 5 microns (μm) to about 40 microns (μm). In some examples, the image receiving layer (120) has a smooth surface with a PPS smoothness that is less than 1.5 micro (μm) or less than 0.8 micro (μm). It is believed that any surface with roughness greater than this range will results an undesirable image quality like mottling.

In some examples, the image receiving layer (120) contains pigment fillers and polymeric binders. The image receiving layer (120) can also contain pigment fillers, polymeric binders and latex film-forming agents. The pigment fillers can be either inorganic and/or organic particulates, either in solids powder form or in a dispersed slurry form. Examples of inorganic pigment filler include, but are not limited to, aluminum silicate, kaolin clay, a calcium carbonate, silica, alumina, boehmite, mica, talc, and combinations or mixtures thereof. The inorganic pigment filler can include clay or a clay mixture. The inorganic pigment filler can include a calcium carbonate or a calcium carbonate mixture. The calcium carbonate may be one or more of ground calcium carbonate (GCC), precipitated calcium carbonate (PCC), modified GCC, and modified PCC. The inorganic pigment fillers may also include a mixture of a calcium carbonate and clay. In some examples, the inorganic pigment fillers include two different calcium carbonates pigments (e.g., GCC and PCC). Examples of organic pigment filler include, but are not limited to, particles, either existing in a dispersed slurry or in a solid powder, of polystyrene and its copolymers, polymethacrylates and their copolymers, polyacrylates and their copolymers, polyolefins and their copolymers, such as polyethylene and polypropylene, a combination of two or more of the polymers. The pigments, for the image receiving layer (120), may be chosen from silica gel (e.g., Silojet® 703C available from Grace Co.), modified (e.g., surface modified, chemically modified, etc.) calcium carbonate (e.g., Omyajet® B6606, C3301, and 5010, all of which are available from Omya, Inc.), precipitated calcium carbonate (e.g., Jetcoat® 30 available from Specialty Minerals, Inc.), and combinations thereof. The pigments can be present in an amount ranging, for example, from about 65 wt % to about 85 wt % of the total wt % of the image receiving layer (120).

The polymeric binder, present in the image receiving layer (120), can be an aqueous based binder. Examples of suitable polymeric binders include polyvinyl alcohol, styrene-butadiene emulsion, acrylonitrile-butadiene latex, or any combinations. Moreover, in addition to the above binders, other aqueous binders can be added including: starch (including oxidized starch, cationized starch, esterified starch, enzymatically denatured starch and so on), gelatin, casein, soybean protein, cellulose derivatives including carboxy-methyl cellulose, hydroxyethyl cellulose and the like; acrylic emulsion, vinyl acetate emulsion, vinylidene chloride emulsion, polyester emulsion, and polyvinylpyrrolidone. Other examples of suitable polymeric binders include aqueous based binders such as polyvinyl alcohol (examples of which include Kuraray Poval® 235, Mowiol® 40-88, and Mowiol® 20-98 available from Kuraray America, Inc.), styrene-butadiene emulsions, acrylonitrile-butadiene latex, and combinations thereof. The amount of the polymeric binder, that is present in the image receiving layer (120), can represent from about 5 to about 40 parts per 100 parts of pigment filler by dry weight; or can represent from about 10 to about 30 parts per 100 parts of pigment filler by dry weight.

The image receiving layer (120) might further contain a latex film-forming agent. It is to be understood that the film-forming agent may be capable of lowering the elastic modulus of polymer particulates (specifically found in latex inks to be printed on the printable media) and providing temporary plasticization, which promotes polymer chain motion of the polymer particulates during the film forming process. As such, the polymer particulates are more readily able to coalesce, and therefore the film-forming agent can improve the film-forming properties of the polymer particulates. In some examples, the film-forming agents that are part of the image receiving layer (120), include, citrate compounds, sebacate compounds, ethoxy alcohols, glycol oligomers, glycol polymers, glycol ether, glycerol acetals, anionic, cationic or non-ionic surfactants having a more than 12 carbon backbones (e.g., propylene glycol monoester of C-18 fatty acids and propylene glycol mono oleate (each of which is commercially available under the trade name Loxanol® by BASF Corp), cyclic amides, and combinations thereof. The cyclic amides may be β-lactams (e.g., clavam, oxacephem, cephem, penam, carbapenam, and monobactam), γ-lactams, δ-lactams (e.g., caprolactam and glucarolactam), and combinations thereof. The film-forming agent can be a cyclic amide like lactams such as β-lactam, γ-lactam, and δ-lactam, and mixtures thereof. The latex film-forming agent can also be a γ-lactam. Representative examples of a γ-lactam include N-methyl-2-pyrrolidone, 5-methyl-2-pyrrolidone, and 2-pyrrolidone.

A ratio of the amount of pigment filler to the amount of film-forming agent may be within a range of about 200:1 to about 10:1; or may also be within the range of about 150:1 to about 12:1 or within the range of about 100:1 to about 30:1. In some examples, the image receiving layer (120) comprises pigment filler, an aqueous-based polymeric binder in an amount that ranges from about 5 parts to about 40 parts per 100 parts of the pigment filler by dry weight, and a latex film-forming agent in a ratio of the pigment filler to the latex film-forming agent that is within a range of about 200:1 to about 10:1.

The image receiving layer may further include other additives, e.g., processing aids and property modifiers. Examples of additives that may be incorporated include crosslinking agent, surfactant, defoamer, fixing agent, and/or pH adjuster. The image receiving layer might include from about 1 wt % to about 3 wt % of boric acid as a crosslinking agent, from about 0.5 wt % to about 2 wt % of glycerol, and from about 1 wt % to about 5 wt % of a dye fixing agent (such as, e.g., Locron® P available from Clariant International Ltd). The image receiving layer may also include a defoamer in an amount ranging from about 0.05 wt % to about 0.2 wt % of the total wt % of the image receiving layer. Examples of the defoamer include Foamaster® 1410, 1420, 1430, all of which are available from BASF Corp.

The Barrier Layer (130)

The printable recording media may further comprise a barrier layer (130). Said barrier layer might be deposited over the composite base substrate, on the non-imaging side of the media. In some examples, the barrier layer can be present on the non-image side of the media over the composite base substrate, when the constituent material layers of the composite base substrate are fiber layers which are sourced from natural fiber only. By natural fiber only it is meant herein only that the fiber include wood species only and include fibers from recycling pulps (i.e. wood fiber base) and do not contain polymer fiber.

The barrier layers are resin-rich pigment coating layers that reduce the penetration of exterior moisture into the substrate. The barrier layer includes one or more types of pigment particles and polymer resin binder. The term "resin-rich" refers to compositions in which larger proportions of polymer resin components are included than are needed to bind the pigment particles to each other and the barrier layer to the underlying substrate, which can be in the range of 5-20% by weight of total coating amount. For example, a resin-rich barrier layer may include polymer resins in amounts that are at least 30% by weight of the total pigment fillers. In one example, the barrier layer includes 60 to 80% resins by total weight of barrier layer.

A wide variety of resin compositions which can be used in the barrier layer. For example, the resin compositions may include, but are not limited to, resins formed by polymerization of hydrophobic addition monomers. Examples of hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmethacrylate), carboxylica containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), and combinations thereof. In particular, polymers made from the polymerization and/or copolymerization of alkyl acrylate, alkyl methacrylate, vinyl esters, and styrene derivatives may be useful. The polymers can be made using a wide variety of polymerization methods. For example, the polymers may be made using bulk polymerization, solution polymerization, emulsion polymerization, or other suitable methods. In one implementation, the emulsion polymerization in the presence of aqueous solvent such as water may be useful in making the polymer resins described above. In one example, the polymer latex resin was made using emulsion polymerization with a particle size ranging from 0.1 to 5 micrometers. The range of particles sizes can be narrower in some implementations. For example, the particle size may range from 0.5 to 3 micrometers. The glass transition temperature, Tg, of polymer resin can be another factor that influences the desired performance. The glass transition temperature of the polymer resin can be in the range of from about 20 to about 50° C.

Inorganic pigments can also be present in barrier coating layer composition. In one implementation, the inorganic pigments in the barrier coating layers can have a mean size from 0.2 micrometers to 1.5 micrometers. These inorganic pigments can be in a powder or slurry form, and examples include, but are not limited to, titanium dioxide, hydrated alumina, calcium carbonate, barium sulfate, silica, clays (such as high brightness kaolin clays), and zinc oxide. In some examples, the inorganic pigment is calcium carbonate.

Method for Forming a Printable Recording Media

In some examples, according to the principles described herein, a method for forming a printable media with a composite supporting base substrate (110), with two constituent material layers and a flame resistant adhesion layer (113) and an image receiving layer (120) applied on top of this composite supporting base substrate is provided. In some examples, the printable media is a wall covering media. Such composite supporting base substrate (110) has two constituent material layers that are laminated together with the flame resistant adhesion layer (113); at least, one of the constituent material layers is a fiber layer. The flame resistant adhesion layer (113) contains an adhesive compound and up to 50% of a flame retardant agent by total weight of the flame resistant adhesion layer.

FIG. 4 is a flowchart illustrating a method (300) of making the printable media (100) such as described herein. Such method encompasses: providing (310) two constituent material layers wherein, at least, one of the constituent material layer is a fiber layer (111) and a flame resistant adhesion layer (113) containing an adhesive compound and up to 50% of a flame retardant agent by total weight of the flame resistant adhesion layer; laminating (320) the constituent material layers and flame resistant adhesion layer (113) to form a composite supporting base substrate (110); and coating (330) an image receiving layer (120) onto a constituent material layer of the composite supporting base substrate. In some examples, the method further encompasses applying a barrier layer (140) on the back side of composite base substrate (i.e. over one constituent material layer (111) or (112)).

The method (300), for forming the printable media, comprises providing (310), at least, two constituent material layers and a flame resistant adhesion layer (113) in view of forming a composite supporting base substrate (110) wherein one of the two constituent material layers is a fiber layer (111). In some examples, one of the two constituent material layers is a fiber layer (111) and the other constituent material layer is a fabric layer (112). When a constituent material layer is a fabric layer (112), said fabric layer can be provided, for example, using a textile manufacturing technique. Said layer can be, for examples, any woven, non-woven, knitted or tufted fabric structures.

The fiber layer (111) may include a synthetic polymeric component. The fiber layer may be a non-woven paper composition that is formed using paper making techniques and paper making equipment. In this example, the fiber layer (111) containing fibers is formed using a paper making process (the wet forming process), where fibers are suspended in water, brought to a forming unit where the water is drained off through a continuous moving wire or screen and the fibers are deposited on the wire, and then the fibers are picked off the wire to be dried. In order to have a targeted formed web or sheet, the fiber concentration for the non-woven paper composition may be very low, such as less than about 0.5% by weight. Synthetic polymeric material used in forming the fiber layer may not be capable of being self-bonded together, for example with hydrogen bonding as natural wood fiber is. Therefore, an external bonding method is employed with the synthetic polymeric fiber, such as with one or more of a variety of binder types and application methods. For example, a binder may be applied either before web formation or after web formation. After web formation, the binder may be applied by saturation, spraying, printing, foaming, or a combination thereof. After application of the binder, the web may be dried and in some examples, the binder may be activated, with steam heated cans, for example. At the end of the processing line, the web is calendered to densify, smooth, and soften the non-woven paper to achieve a target density and smoothness of the fiber layer. For example, the target smoothness of no greater than 5 microns by PPS method is achieved with various combinations of calender pressure within a range of about 35 kilograms per square centimeter (kg/cm2) to about 140 kg/cm2 and calender temperature within a range of about 25° C. to about 300° C.

The constituent material layers (111) and/or (112) and the flame resistant adhesion layer (113) are laminated (320) together using a laminator. In some examples, constituent material layers and the flame resistant adhesion layer (113) are fed together at a lamination roll where they are laminated together, and dried in a drying oven or dryer and wound onto a finished roll in order to form the composite supporting substrate (110). In some examples, a tension within a range of about 60 Newton (N) to about 120 N may be applied to the fiber layer, and a tension within a range of 80 N to about 160 N may be applied to the other constituent material using a laminator. In some other examples, the constituent material layers and the flame resistant adhesion layer (113) are laminated together at the lamination roll at a speed that may range from about 10 meters/minute to 30 meters/minute, and then dried and cured in the dryer using a peak temperature that may range from about 80° C. to about 150° C.

Examples of lamination equipment include, but are not limited to, Talon 64 (152.4 cm wide web) from GBC, Lincolnshire, Ill.; 62 Pro laminating machine (152.4 cm wide web) from Seal, Elkridge, Md.; and lamination machines from Polytype Converting Ltd., Freiburg, Switzerland. Coating and laminating machines may be obtained from Faustel, Germantown, Wis. and Black Clawson Ltd, Newport, South Wales, UK, for example.

The method (300) for forming the printable media further comprises coating (330) an image receiving layer (120) on the image side (101) of the composite supporting base substrate (110), using a coater or any applicators. The image receiving layer may be coated using applicator including, but not limited to, one or more a spray coater, a spin coater, a slot die applicator, fountain curtain applicator, blade applicator, rod applicator, air knife applicator, or air brush applicator. The image receiving layer (120) is dried using one or more a blower, a fan, an infrared lamp, and an oven.

A calendering process can then be used to achieve the desired gloss or surface smoothness. Calendering is the process of smoothing the surface of the paper by pressing it between nips formed in a pair of rollers. The rollers can be metal hard roll, and soft roll covered with a resilient cover, such as a polymer roll. The resilient-surface roll adapts itself to the contours of the surface of the substrate and presses the opposite side of substrate evenly against the smooth-surface press roll. Any of a number of calendering devices and methods can be used. The calendering device can be a separate super-calendering machine, an on-line calendaring unit, an off-line soft nip calendaring machine, or the like. In some examples, the calendering is carried out at room temperature. In some examples, the calendering is carried out at a temperature ranging from about 50 to about 150° C. (metal roll surface temperature) and, in some other examples, from about 80 to about 110° C. The nip pressure can be any value between about 50 to about 500 KN/cm2.

In some examples, the back-side (102) (or non-image side) of the printable media (100), specifically when used as a wall covering media, can be pre-applied with an adhesive for adhering to a wall or other surface. In some other examples, the printable media (100) can be applied on a wall, as a wall covering, using a commercial available adhesive. Examples of commercial wall-adhering adhesives for wall coverings include, but are not limited to, Pro-880 Premium Clear Strippable, Pro-838 Heavy Duty Clear, Pro-543 Universal, ECO-888 Strippable with Mildew Guard, and Golden Harvest Wheat wallpaper adhesives, all from Roman Decorating Products, IL, USA; Zinsser® Sure Grip®-128 and Zinsser Sure Grip®-132 wallpaper adhesives, both from Rust-Oleum® Corporation, USA; Dynamite® 234, Dynamite® C-11, Dynamite® DEFENDER wallpaper adhesives, each by Gardner-Gibson, FL, USA; Polycell® Paste the Wall wallpaper adhesive from AkzoNobel Group of Companies, UK; ECOFIX adhesive from Ecofix AB, Sweden; and Metylan and Solvite wallpaper adhesives from Henkel, Germany.

Printing Method

The printable recording media (100) as described herein can be used in a printing method. The printing method encompasses obtaining a printable media comprising a composite base substrate (110) that contains, at least, two constituent material layers that are laminated together with a flame resistant adhesion layer (113) containing an adhesive compound and up to 50% of a flame retardant agent by total weight of the flame resistant adhesion layer, wherein, at least, one of the constituent material layer is a fiber layer (111); and an image receiving layer (120) that is coated on one side of the composite supporting substrate; and, then, applying an ink composition onto said printable media to form a printed image. Said printed image will have, for examples, enhanced image quality and image permanence.

The printable media, as disclosed herein, may be used as a wall covering material (e.g., wallpaper) for home or commercial use, for decoration or display. The printable media can thus be a printable wall covering media. The printable media is specifically designed to receive any inkjet printable ink, such as, for example, organic solvent-based inkjet inks or aqueous-based inkjet inks. The ink composition forms an image on the image side of the printable media or on the image side of wall covering media.

The ink composition may be deposited, established, or printed on the printable media using any suitable printing device. In some examples, the ink composition is applied to the printable media via inkjet printing techniques. The ink may be deposited, established, or printed on the media via continuous inkjet printing or via drop-on-demand inkjet printing, which includes thermal inkjet printing and piezoelectric inkjet printing. Representative examples of printers used to print on the printable media or wall covering media, as defined herein, include, but are not limited to, HP DesignJet printers: L25500, L26500, and L65500; HP Scitex printers: LX600, LX800, LX850, and TurboJet 8600 UV from Hewlett-Packard Company. Representative inkjet inks used by the above-listed printers include, but are not limited to, HP 791, HP 792, and HP Scitex TJ210. The printers may be used in a standard wall paper profile with a production print mode or a normal print mode. The print mode may vary the ink application within a range of from about 50% to about 250% of each other.

Some examples of inkjet inks that may be deposited, established, or otherwise printed on the printable media include pigment-based inkjet inks, dye-based inkjet inks, pigmented latex-based inkjet inks, and UV curable inkjet inks. Additionally, the printable media are also designed to receive thereon a solid toner or a liquid toner. The solid toner or the liquid toner may include toner particles made, e.g., from a polymeric carrier and one or more pigments. The liquid toner may be an organic solvent-based (e.g., hydrocarbon) liquid toner. The solid toner or the liquid toner may be deposited, established, or otherwise printed on the examples of the printable media using, respectively, a suitable dry or liquid press technology, such as a dry toner electrophotographic printing device or a liquid toner electrophotographic printing device.

In some examples, the ink composition is an inkjet ink composition and contains one or more colorants that impart the desired color to the printed message. As used herein, "colorant" includes dyes, pigments, and/or other particulates that may be suspended or dissolved in an ink vehicle. The colorant can be present in the ink composition in an amount required to produce the desired contrast and readability. In some other examples, the ink compositions include pigments as colorants. Pigments that can be used include self-dispersed pigments and non-self-dispersed pigments. Pigments can be organic or inorganic particles as well known in the art. As used herein, "liquid vehicle" is defined to include any liquid composition that is used to carry colorants, including pigments, to a substrate.

In some other examples, the ink composition that is applied to printable media is an ink composition containing latex components. Latex components are, for examples, polymeric latex particulates. Therefore, is some examples, the ink composition contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, or amphoteric polymeric latex. In some examples, the latexes are prepared by latex emulsion polymerization and have a weight average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and chemical components used in the illustrating samples are listed in Table 1.

TABLE 1

| Ingredients | Nature of the ingredients | Supplier |
|---|---|---|
| Hydrocarb ®60 | Calcium carbonate pigment fillers | Omya NA |
| Hydrocarb ®90 | Calcium carbonate pigment fillers | Omya NA |
| Acronal ® 866 | styrene-acrylic binder | BASF Corporation |
| Byk-Dynwet ® 800 | silicone-free wetting agent | BYK USA, Inc. |
| BYK ®-024 | VOC-free silicone defoamer | BYK USA, Inc. |
| 2-pyrrolidinone | Film forming agent | Aldrich Inc. |
| Hycar ®26871 | Latex - adhesive | Lubrizol |
| Ancarez ®AR555 | Epoxy Resin (cross-linked polymeric network) | Air Product |
| Anquawhite ®100 | curing agent | Air Product |
| JSL-APP 101 | ammonium polyphosphate - Flame retardant agent | JLS chemical |
| SpaceRite ® S-3 | Flame retardant agent | J.M.Huber Corp. |

Example 1

Preparation of Printable Media Samples

The illustrating samples 1 to 4 are printing media used in wall covering application, in accordance with the principles described herein. Samples 4 and 5 are comparative examples. Detailed structures of these samples are shown in Table 2. Each sample has a composite support structure (110) and an image receiving layer (120).

The composite supporting substrate (110) comprises a fiber layer (111) that is a non-woven fiber having a composition A (with a basis weight 170 gsm) comprising 12 wt % of polyethylene fiber, 8 wt % of calcium carbonate filler, 69 wt % of natural cellulose fibers and 11 wt % of other additives such as binder, coupling agent, titanium dioxide, color dye and optical brightener agent. The composite supporting substrate (110) comprises also a fabric layer (112) that is a woven fabric having 90% of total fiber count of polyester fibers and 10% of total fiber count of natural cotton fibers, and having a yarn count of 46 by 48.

The composite supporting substrate (110) further comprises a flame resistant adhesion layer (113). The constituent material layers (111) and (112) and the flame resistant adhesion layer (113) are laminated together at a speed of 20 meters/min and dried using a peak temperature of 120° C. in order to obtain a composite supporting substrate (110). The composite supporting substrate is then coated with an image receiving layer (120) with a coat weight of 12 gsm in order to obtain the Samples 1 to 6 as illustrated in the Table 2.

TABLE 2

| | Composite Structure (110) | | | |
|---|---|---|---|---|
| Samples # | Fiber layer (111) | Fabric layer (112) | Flame resistant adhesion layer (113) | Image receiving layer (120) |
| Sample 1 | Composition A 170 gsm | Fabric 90 gsm | Coating I 60 gsm | 12 gsm |
| Sample 2 | Composition A 170 gsm | Fabric 90 gsm | Coating II 60 gsm | 12 gsm |
| Sample 3 | Composition A 170 gsm | Fabric 90 gsm | Coating III 50 gsm | 12 gsm |
| Sample 4 | Composition A 170 gsm | Fabric 90 gsm | Coating IV 25 gsm | 12 gsm |
| Sample 5 comparative | Composition A 170 gsm | Fabric 90 gsm | Coating V 35 gsm | 12 gsm |
| Sample 6 comparative | Composition A 170 gsm | Fabric 90 gsm | Coating VI 60 gsm | 12 gsm |

Different flame resistant adhesion layer compositions (113) (i.e. coatings I to VI), are formulated. Such formulations are illustrated in Table 3 below. Each number expresses the dry amount (in Parts).

TABLE 3

| | Flame resistant adhesion layer (113) | | | | | |
|---|---|---|---|---|---|---|
| Ingredient | Coating I | Coating II | Coating III | Coating IV | Coating V comparative | Coating VI comparative |
| Hycar ®26871 | 55 | 55 | 55 | 55 | 100 | 55 |
| SpaceRite ® S-3 | 35 | 35 | — | 35 | 0 | 100 |
| JSL-APP 101 | — | — | 25 | — | — | — |
| Ancarez ®AR555 | 5 | 5 | 5 | 5 | 10 | 5 |
| Anquawhite ®100 | 5 | 5 | 5 | 5 | 10 | 5 |
| Hydrocarb 90 | 0 | 10 | 10 | 0 | 5 | 0 |
| PVOH | 0 | 0.2 | 0.2 | 0 | 0.2 | 0.2 |

The formulation of the image receiving layer (120) is illustrated in Table 4 below. The image receiving layer (120) is prepared in a high shear mixer. The final solids content after mixing is 52% and the viscosity is 180 centipoise (cps) as measured by a Brookfield viscometer at 100 rpm. The image receiving layer (120) is applied to the printable media samples at a coat weight of 12 gsm on the image side of the composite structure (110). A production coater equipped with Mayer rod application station is used to coat the coating layers with wet-on-dry sequence. Drying is accomplished in an 8 meter hot air drying channel with a total coating speed of 20 meters per minute.

TABLE 4

| Image receiving layer (120) | |
| --- | --- |
| Ingredient | Amount (Parts) |
| Hydrocarb ® 60 | 80 |
| Hydrocarb ® 90 | 20 |
| Acronal ® 866 | 15 |
| 2-pyrrolidinone | 1 |
| Byk-Dynwet ® 800 | 0.5 |
| BYK ®-024 | 0.2 |

Example 2

Printable Recording Media Samples Performances

Samples 1 to 6 are evaluated according to an industrial standard for durable wall coverings known as ASTM F793, "Standard Classification of Wall Covering by Use Characteristic" (version 2010 substantially followed Federal Specification CCC-W-408D), which defines the durability requirements of wall coverings from "decorative" wall coverings (Category I) to more stringent use cases defined as "commercial serviceability" wall coverings Type I (Category IV), Type II (Category V), Type III (Category VI) and up to "Type IV".

Samples 1 to 6 are printed using an HP DesignJet L26500 printer equipped with HP 792 latex inks, using a six color process at 110° C. and at a speed of 100 square feet per hour (a 10 pass bidirectional color profile). An image is created on each Sample with an equal percentage of each of the six ink colors. A final visual appearance of the image is a grey-looking area on the Samples. Per ASTM F793, the image included many different colors.

The printed media are then evaluated for different performances: Fire Retardancy performances, peel scrim performances, abrasion, stain removal performances and image quality. The results of these tests are illustrated in Table 5 below.

The fire Retardancy test is evaluated according to the ASTM F793 & ASTM E84 methods. 2 ft wide×25 ft long unprinted samples are applied to gypsum wall board and ignited. Flame Spread Index (FSI) must be inferior to 25 to order to pass the test. The results, in Table 5, show the FSI and whether or not, the samples are passing the test.

The scrubbability test (Scrub test), in accordance with ASTM F793, is performed by exposing the various Samples to be tested, to a nylon bristle brush and detergent solution (made in accordance with "Note 1" under section 7.4.1 of ASTM F793) in a BYK Abrasion Tester (from BYK-Gardner USA, Columbus, Md.) with a linear, back-and-forth action, attempting to wear down the image side of the Samples (300 cycles of a nylon brush over a printed surface, wet with trisodium-phosphate based cleaning solution). After the test is concluded, the Samples are rated "pass" or "fail" according to the guidelines listed in 7.7.2 and the visual rating criteria listed in 7.4.2 of ASTM F793. Any "visual difference" in the printed surface fails the test (score equal or below 3). If there is no difference, then the sample passes (score 4-5).

The Stain test is evaluated according to the ASTM F793 method (section 7.5.1) that directs to lay specimens horizontally with decorative surface upwards. 12 reagents are placed onto the surface, covered with a watch glass, and then removed after 24 hrs. Each spot is visually rated. The passing criteria are stated as "there shall be no evidence of appreciable change to the decorative surface". The "stain rating handbook" is used to facilitate the visual ranking, thereby defining a 1-5 ranking system in which the rating from 1 to 3.5 are considered a "FAIL", and from 4 to 5 are considered to be a "PASS". To meet ASTM F793 Type II criteria, the sample must have a PASS ranking for all 12 reagents. The reagents as listed in ASTM F793 are: DI water 18.3 degrees Celsius to 23.8 degrees Celsius, DI water 46.1 degrees Celsius to 51.6 degrees Celsius, EtOH, Vinegar, 3%, Alkali solution, HCl, 5%, Soap solution, Pure orange juice, Butter, Catsup, Tea.

Image quality is evaluated using both numeric measurement method (72 color gamut) and visual evaluation method. The method involves printing standardized diagnostic images onto the said printing media, then numerically measuring gamut/color saturation, ink bleed, coalescence, text clarity, ink dry time, and gloss level, using spectrophotometer (such as the X-Rite i1/i0) and single-angle gloss-meter (such as the BYK Gloss-meter). Visual evaluations are done in a light box under standard lighting conditions, such as D65 (6500K), with the image at a known distance & viewing angle. The attributes under visual evaluation are ink bleed area fill uniformity for defects such as coalescence, mottle grain.

The Peel Scrim test evaluates the adhesion bonding strength between the backing scrim layer and primary substrate. These measurements are made according to the ASTM F793 method. The test is performed in HP's Analytical Services Lab by exposing the Samples to a standard force-gauge tester, Instron Model No. 5566 (Tensile & Tear Instrument, from Instron) (a mechanical tool which holds the primary substrate, and then peels away the scrim from the backside and measures force with respect to distance). The strength is expressed in (kg-force/mm) for the Machine Direction (MD) and for the Cross-Machine Direction (CMD). The results are expressed in the Table 5 below.

TABLE 5

| Samples | Fire Retardancy (FSI) | Scrim peel strength MD/CD | Stain Test (visual ranking) | Scrub Test (visual ranking) | Image quality test results |
| --- | --- | --- | --- | --- | --- |
| Sample 1 | 15 (Pass Type II) | Good (Score = 4) | Each reagent scores 4-5 (Pass Type II) | No visual wearing of surface (Pass Type II) | 425,000 |
| Sample 2 | 15 (Pass Type II) | Excellent (Score = 5) | Each reagent scores 4-5 (Pass Type II) | No visual wearing of surface (Pass Type II) | 425,000 |

TABLE 5-continued

| Samples | Fire Retardancy (FSI) | Scrim peel strength MD/CD | Stain Test (visual ranking) | Scrub Test (visual ranking) | Image quality test results |
|---|---|---|---|---|---|
| Sample 3 | 25 (Pass Type II) | Good (Score = 4) | Each reagent scores 4-5 (Pass Type II) | No visual wearing of surface (Pass Type II) | 425,000 |
| Sample 4 | 25 (Pass Type II) | Average (Score = 3) | Each reagent scores 4-5 (Pass Type II) | No visual wearing of surface (Pass Type II) | 425,000 |
| Sample 5 comparative | 30 (Does not pass Type II) | Excellent (Score = 5) | Each reagent scores 4-5 (Pass Type II) | No visual wearing of surface (Pass Type II) | 425,000 |
| Sample 6 comparative | 15 (Pass Type II) | Poor (Score = 2) | Each reagent scores 4-5 (Pass Type II) | No visual wearing of surface (Pass Type II) | 425,000 |

The invention claimed is:

1. A printable recording media, comprising:
   a. a composite base substrate that contains, at least, two constituent material layers that are laminated together with a flame resistant adhesion layer, containing an adhesive compound and up to 50% of a flame retardant agent by total weight of the flame resistant adhesion layer; wherein, at least, one of the constituent material layer is a fiber layer;
   b. and an image receiving layer that is coated on one side of the composite supporting substrate.

2. The printable recording media of claim 1 wherein the two constituent material layers of the composite base substrate are fiber layers.

3. The printable recording media of claim 1 wherein the fiber layer of the composite base substrate contains a synthetic polymeric material as a first material and a natural fiber as a second material.

4. The printable recording media of claim 1 wherein the fiber layer of the composite base substrate contains a non-woven fiber structure that comprises synthetic polymeric materials within a range of about 5% to about 40% by weight of total fibers.

5. The printable recording media of claim 1 wherein one constituent material layer of the composite base substrate is a fabric layer.

6. The printable recording media of claim 1 wherein one constituent material layer of the composite base substrate is a fabric layer that comprises natural fibers and synthetic fibers wherein the amount of synthetic fibers represents from about 20% to about 90% of the total amount of fibers.

7. The printable recording media of claim 1 wherein the flame resistant adhesion layer forms a layer, between two constituent material layers of the composite base substrate, that has a coat weight ranging from about 30 gsm to about 60 gsm.

8. The printable recording media of claim 1 wherein, in the flame resistant adhesion layer, the ratio of the amount of adhesive compound to the amount of flame retardant agent is within the range of about 50:50 to about 80:20.

9. The printable recording media of claim 1 wherein the adhesive compound of the flame resistant adhesion layer is polymeric latex.

10. The printable recording media of claim 1 wherein the flame resistant adhesion layer further comprises a curing agent.

11. The printable recording media of claim 1 wherein the flame resistant adhesion layer comprises water-based epoxy resin as an adhesive compound and water-based polyamine as a curing agent.

12. The printable recording media of claim 1 wherein the flame retardant agent is selected from the group consisting of phosphorus-containing compounds, nitrogen-containing compounds, organophosphate compounds, alumina trihydrate and calcium carbonate.

13. The printable recording media of claim 1 that further comprises a barrier layer, including one or more types of pigment particles and polymer resin binder, which is deposited over the composite base substrate on the non-imaging side of the media.

14. A method for forming a printable recording media, comprising:
   a. providing two constituent material layers wherein, at least, one of the constituent material layer is a fiber layer and a flame resistant adhesion layer containing an adhesive compound and up to 50% of a flame retardant agent by total weight of the flame resistant adhesion layer, wherein, at least, one of the constituent material layer is a fiber layer;
   b. laminating the constituent material layers and the flame resistant adhesion layer to form a composite supporting base substrate;
   c. and coating an image receiving layer onto a constituent material layer of the composite supporting base substrate.

15. A printing method that comprises:
   a. obtaining a printable recording media comprising a composite base substrate that contains, at least, two constituent material layers that are laminated together with a flame resistant adhesion layer containing an adhesive compound and up to 50% of a flame retardant agent by total weight of the flame resistant adhesion layer, wherein, at least, one of the constituent material layer is a fiber layer; and an image receiving layer that is coated on one side of the composite supporting substrate;
   b. and, then, applying an ink composition onto said printable recording media to form a printed image.

* * * * *

UNITED STATES PATENT AND TRADEMARK OFFICE
CERTIFICATE OF CORRECTION

PATENT NO. : 9,707,790 B2
APPLICATION NO. : 15/119485
DATED : July 18, 2017
INVENTOR(S) : Xulong Fu et al.

Page 1 of 1

It is certified that error appears in the above-identified patent and that said Letters Patent is hereby corrected as shown below:

On the Title Page

Item (12) should read --Fu et al.--

Item (72) "Xulong Fu, Jr." should read --Xulong Fu--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*